US00RE43077E

(19) United States
(12) Reissued Patent
Hakim

(10) Patent Number: US RE43,077 E
(45) Date of Reissued Patent: Jan. 10, 2012

(54) NO-SPILL DRINKING CUP APPARATUS

(75) Inventor: Nouri E. Hakim, Monroe, LA (US)

(73) Assignee: Luv n' care, Ltd., Monroe, LA (US)

(21) Appl. No.: 11/981,851

(22) Filed: Oct. 31, 2007

Related U.S. Patent Documents

Reissue of:
(64) Patent No.: 6,321,931
Issued: Nov. 27, 2001
Appl. No.: 09/138,588
Filed: Aug. 21, 1998

U.S. Applications:
(60) Provisional application No. 60/056,218, filed on Aug. 21, 1997.

(51) Int. Cl.
*A47G 19/22* (2006.01)
*A61J 9/00* (2006.01)
*B65D 51/16* (2006.01)

(52) U.S. Cl. ..... 220/714; 220/203.29; 215/11.4; 215/387

(58) Field of Classification Search ..... 220/714, 220/711, 717, 716, 202, 203.01, 203.29, 220/203.28, 203.19, 203.11, 703; 215/11.4, 215/387, 260, 261, 200; 222/491; 137/859, 137/852, 843, 511
See application file for complete search history.

(56) References Cited

U.S. PATENT DOCUMENTS 1,560,689 A 11/1925 Holt et al.
1,954,748 A 4/1934 Punta et al.
2,107,442 A 2/1938 Hughes
2,174,361 A 9/1939 Condon
2,223,179 A 11/1940 Lougheed
(Continued)

FOREIGN PATENT DOCUMENTS

AU 254125 7/1963
(Continued)

OTHER PUBLICATIONS

Federal Circuit Decision of Feb. 23, 2007 in appeal of *Nouri E. Hakim* v. *Cannon Avent Group, PLC, et al.* (Appeal No. 05-1398).

(Continued)

*Primary Examiner* — Mickey Yu
*Assistant Examiner* — Robert J Hicks
(74) *Attorney, Agent, or Firm* — Goldberg Cohen LLP

(57) ABSTRACT

An improved no-spill cup construction and valve assembly which provides an extremely secure seal against accidental liquid flow from the cup spout. The act of sucking at the cup spout creates negative pressure or a partial vacuum against a valve near the spout, causing the valve to invert which unblocks an opening in the valve. When the opening is unblocked, liquid can flow freely through the valve and spout. When not in use, the valve sits in a resting, closed position, with the valve pressed against a center seal-off, sealing off the opening in the valve assembly. The closed position provides an extremely secure seal against fluid leakage, such that inadvertent spills or even deliberate attempts to force liquid outside of the cup, such as by turning the cup upside down, or shaking the cup, are ineffective. The cup assembly further allows liquid flow to be regulated between regular or maximum flow and minimal flow levels or rates by rotating the position of the valve assembly in the cover of the cup.

21 Claims, 14 Drawing Sheets

U.S. PATENT DOCUMENTS

| | | | | | |
|---|---|---|---|---|---|
| 2,250,266 | A | | 7/1941 | Kaye | |
| 2,584,359 | A | | 2/1952 | Miles | |
| 3,206,079 | A | | 9/1965 | Mancusi, Jr. | |
| 3,263,850 | A | * | 8/1966 | Scott | 215/261 |
| 3,292,808 | A | * | 12/1966 | Greene | 215/11.5 |
| 3,321,114 | A | | 5/1967 | Croyle | |
| 3,360,169 | A | | 12/1967 | Susuki et al. | |
| 3,409,160 | A | * | 11/1968 | Scott | 215/261 |
| 3,618,825 | A | | 11/1971 | Clarke | |
| 3,718,140 | A | | 2/1973 | Yamauchi | |
| 3,840,153 | A | | 10/1974 | Devlin | |
| 3,860,162 | A | | 1/1975 | Schutz | |
| 3,915,331 | A | | 10/1975 | Chenault | |
| 4,102,476 | A | | 7/1978 | Loeffler | |
| 4,135,513 | A | | 1/1979 | Arisland | |
| 4,186,842 | A | | 2/1980 | Albert | |
| 4,324,097 | A | | 4/1982 | Schmitt et al. | |
| 4,506,809 | A | | 3/1985 | Corsette | |
| 4,533,062 | A | | 8/1985 | Krautkramer | |
| 4,600,111 | A | | 7/1986 | Brown | |
| 4,623,069 | A | | 11/1986 | White | |
| 4,624,286 | A | | 11/1986 | Frohn | |
| 4,646,781 | A | | 3/1987 | McIntyre et al. | |
| 4,685,577 | A | * | 8/1987 | Chen | 215/11.5 |
| 4,801,027 | A | | 1/1989 | Hunter | |
| 4,836,404 | A | | 6/1989 | Coy | |
| 4,871,077 | A | | 10/1989 | Ogden et al. | |
| 4,941,598 | A | | 7/1990 | Lambelet, Jr. et al. | |
| 4,946,062 | A | | 8/1990 | Coy | |
| 4,993,568 | A | | 2/1991 | Morifuji et al. | |
| 5,033,647 | A | | 7/1991 | Smith et al. | |
| 5,050,758 | A | | 9/1991 | Freeman et al. | |
| 5,079,013 | A | * | 1/1992 | Belanger | 426/115 |
| 5,101,991 | A | | 4/1992 | Morifuji et al. | |
| 5,101,992 | A | | 4/1992 | Serre | |
| 5,176,271 | A | * | 1/1993 | Painchaud et al. | 215/261 |
| 5,186,347 | A | | 2/1993 | Freeman et al. | |
| 5,213,236 | A | * | 5/1993 | Brown et al. | 222/212 |
| D339,197 | S | | 9/1993 | Ziegler | |
| 5,244,105 | A | | 9/1993 | Serre | |
| 5,250,266 | A | | 10/1993 | Kanner | |
| 5,273,172 | A | * | 12/1993 | Rossbach et al. | 215/229 |
| 5,339,995 | A | * | 8/1994 | Brown et al. | 222/173 |
| RE34,725 | E | | 9/1994 | Braden | |
| 5,363,983 | A | | 11/1994 | Proshan | |
| 5,377,877 | A | * | 1/1995 | Brown et al. | 222/105 |
| 5,388,615 | A | | 2/1995 | Edlund et al. | |
| 5,409,144 | A | * | 4/1995 | Brown | 222/185.1 |
| 5,433,328 | A | | 7/1995 | Baron et al. | |
| 5,439,143 | A | * | 8/1995 | Brown et al. | 222/185.1 |
| 5,542,670 | A | * | 8/1996 | Morano | 220/714 |
| 5,582,315 | A | | 12/1996 | Reid | |
| 5,607,073 | A | | 3/1997 | Forrer | |
| 5,609,582 | A | | 3/1997 | Krutten | |
| 5,651,471 | A | | 7/1997 | Green | |
| 5,702,025 | A | | 12/1997 | Di Gregorio | |
| 5,706,973 | A | * | 1/1998 | Robbins et al. | 220/714 |
| 5,769,285 | A | | 6/1998 | Upham et al. | |
| 5,784,999 | A | | 7/1998 | Larson et al. | |
| 5,788,097 | A | | 8/1998 | McInnes | |
| 5,791,510 | A | | 8/1998 | Paczonay | |
| 5,797,505 | A | | 8/1998 | Kaura | |
| 5,839,614 | A | * | 11/1998 | Brown | 222/185.1 |
| 5,890,619 | A | * | 4/1999 | Belanger | 220/713 |
| 5,890,620 | A | * | 4/1999 | Belcastro | 220/714 |
| 5,890,621 | A | * | 4/1999 | Bachman et al. | 220/717 |
| 5,897,013 | A | * | 4/1999 | Manganiello | 220/252 |
| 5,950,878 | A | * | 9/1999 | Wade et al. | 222/207 |
| 6,045,004 | A | * | 4/2000 | Elliott | 222/83 |
| 6,050,445 | A | | 4/2000 | Manganiello | |
| 6,112,919 | A | | 9/2000 | Ho | |
| 6,161,710 | A | | 12/2000 | Dieringer et al. | |
| RE37,016 | E | | 1/2001 | Morano | |
| 6,230,923 | B1 | | 5/2001 | Hung | |
| 6,269,968 | B1 | | 8/2001 | Belcastro | |
| 6,305,570 | B1 | | 10/2001 | Atkin et al. | |
| 6,321,931 | B1 | | 11/2001 | Hakim | |
| 6,343,704 | B1 | | 2/2002 | Prentiss | |
| 6,994,225 | B2 | | 2/2006 | Hakim | |
| 2002/0011583 | A1 | | 1/2002 | Getzewich et al. | |
| 2002/0063103 | A1 | | 5/2002 | Kiernan | |

FOREIGN PATENT DOCUMENTS

| | | |
|---|---|---|
| CN | 2163761 | 5/1994 |
| DE | 450685 | 10/1927 |
| DE | 678886 | 7/1939 |
| DE | 1018740 | 10/1957 |
| DE | 6946466 | 2/1970 |
| DE | 2024427 | 12/1971 |
| DE | 2634226 | 2/1978 |
| DE | 27 04 164 | 8/1978 |
| DE | 295 00 819.9 | 3/1995 |
| DE | 195 10 007 | 10/1995 |
| DE | 296 08 342 | 7/1996 |
| DE | 297 06 653 | 7/1997 |
| EP | 0388828 | 9/1990 |
| EP | 0 473 994 | 3/1992 |
| FR | 695291 | 12/1930 |
| FR | 780094 | 4/1935 |
| FR | 1 191 181 | 4/1959 |
| FR | 2 305 361 | 10/1976 |
| FR | 2373740 | 7/1978 |
| FR | 2605293 | 4/1988 |
| FR | 2717778 | 9/1995 |
| GB | 379428 | 9/1932 |
| GB | 752796 | 7/1956 |
| GB | 1301755 | 1/1973 |
| GB | 1448427 | 9/1976 |
| GB | 1 593 084 | 7/1981 |
| GB | 2 169 210 | 7/1986 |
| GB | 2 215 318 | 9/1989 |
| GB | 2 258 860 | 2/1993 |
| GB | 2 266 045 | 10/1993 |
| GB | 2 279 130 | 12/1994 |
| IT | 594286 | 5/1959 |
| NL | 1 005 120 | 7/1998 |
| WO | WO 94/29187 | 12/1994 |
| WO | WO 95/10965 | 4/1995 |

OTHER PUBLICATIONS

Magistrate's Report and Recommendation of Feb. 2, 2005 re U.S. Patent No. 6,321,931, (U.S. District Court, W.D. Louisiana, Civ. 3-02-1371).

Magistrate's Report and Recommendation of Feb. 2, 2005 re U.S. Patent No. 6,357,620, (U.S. District Court, W.D. Louisiana, Civ. 3-02-1371).

International Search Report from PCT/US98/17379.

International Search Report from PCT/US99/19238.

EPO Search from EP98943302.

EPO Search from EP 06 00 9518.

EPO Search from EP 07 01 5953.

EPO Search from EP 99 94 3860.

* cited by examiner

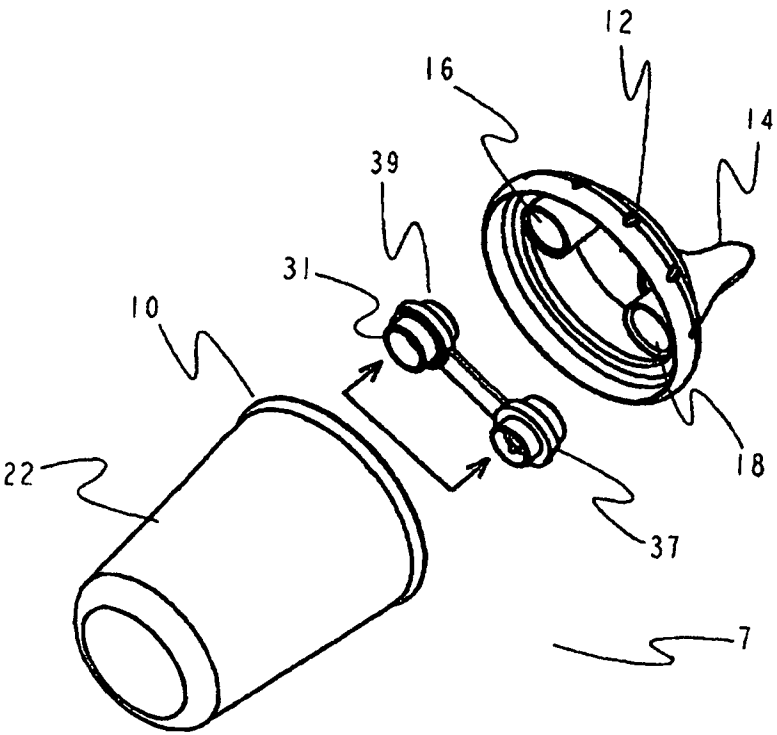
FIG. 1(B)
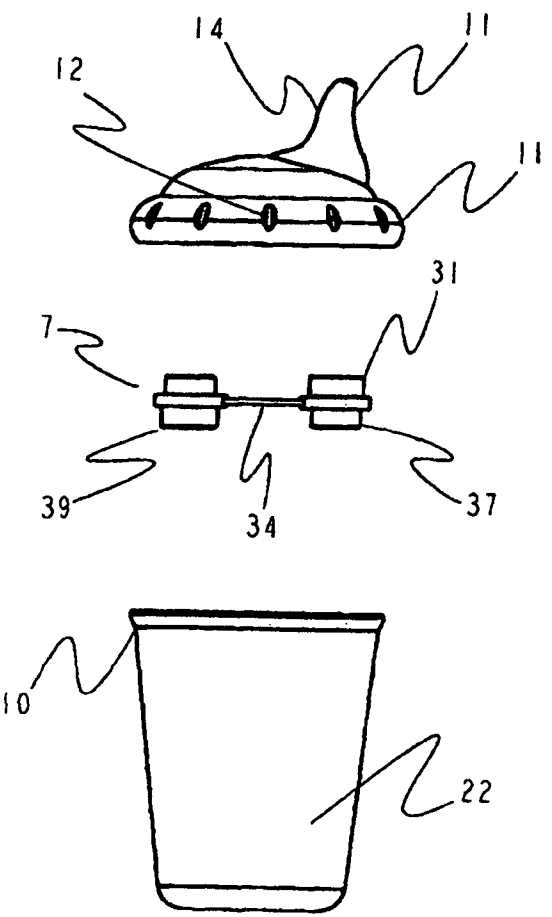
FIG. 1(A)
FIGURE 1

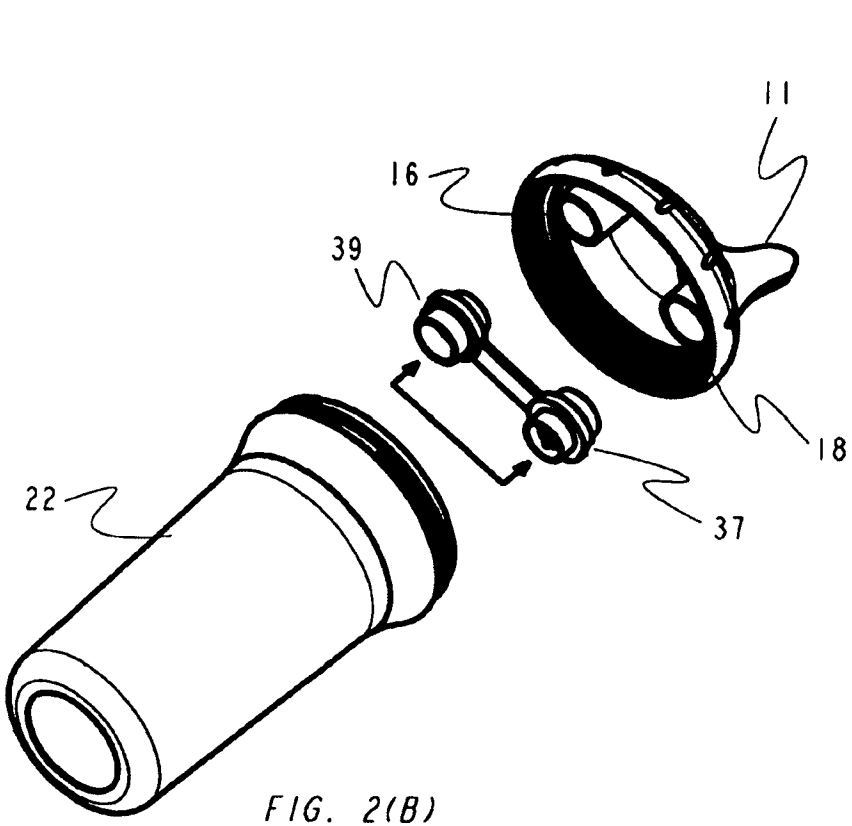
FIG. 2(B)
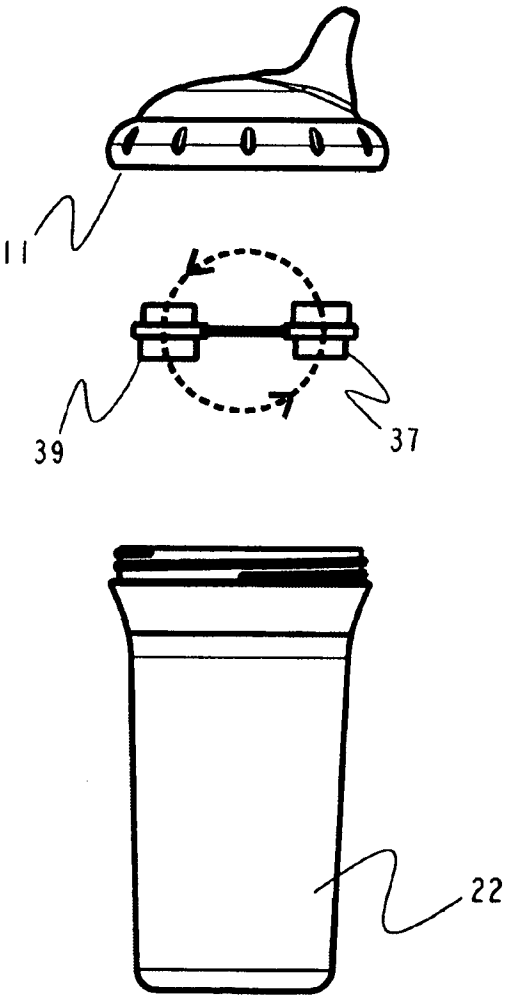
FIG. 2(A)
FIGURE 2

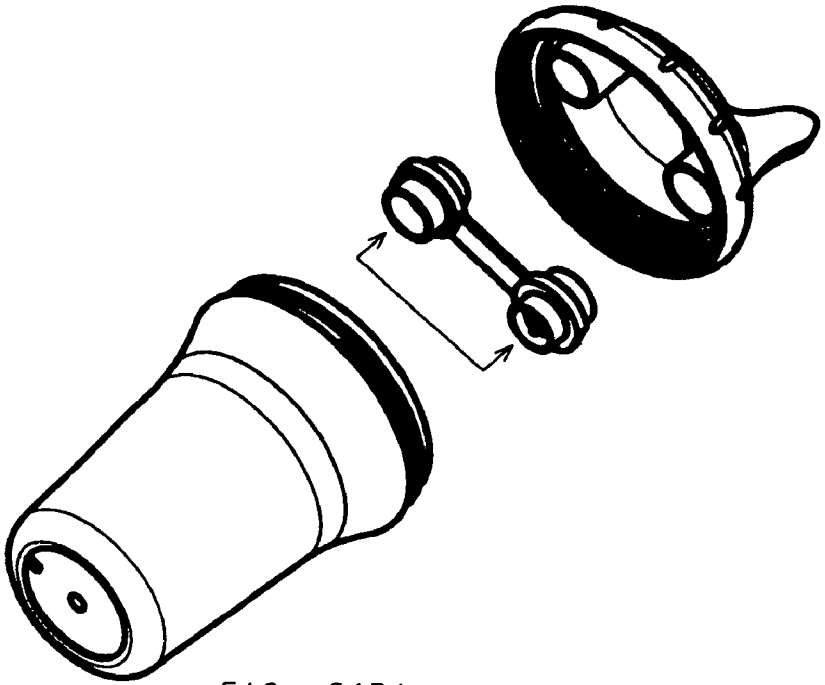
FIG. 5(B)
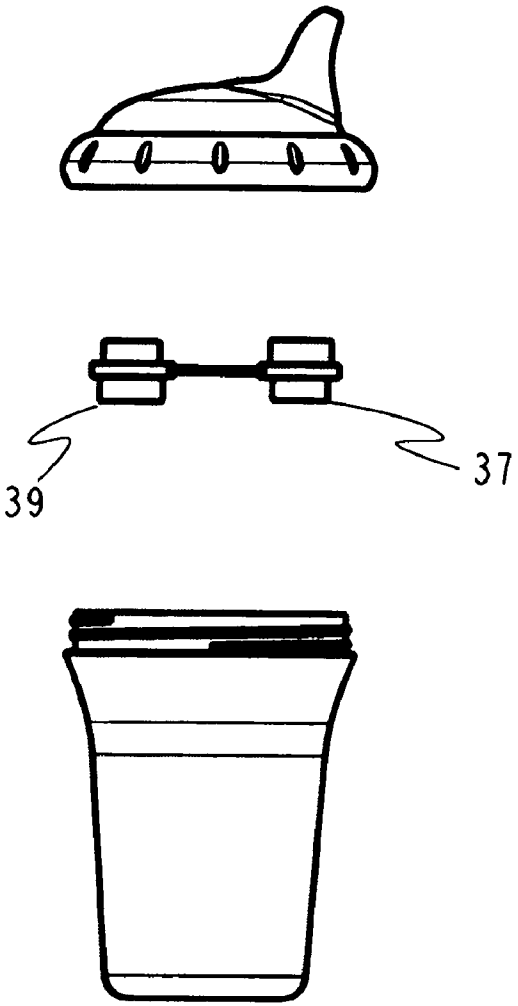
FIG. 5(A)
FIGURE 5

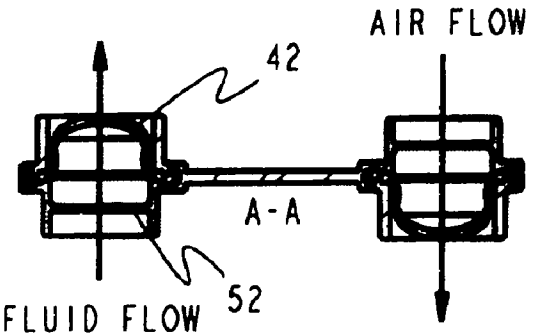
FIG. 6(E)
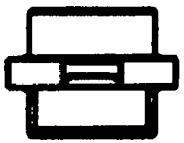
FIG. 6(C)
FIGURE 6
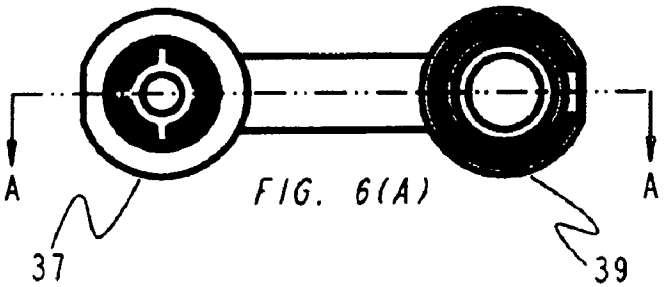
FIG. 6(A)
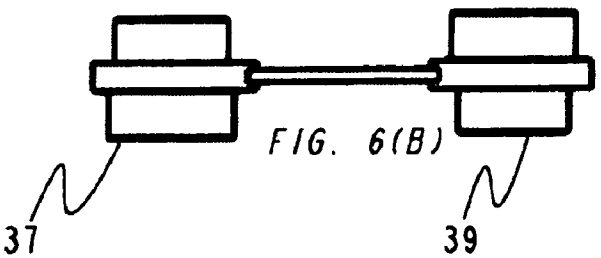
FIG. 6(B)
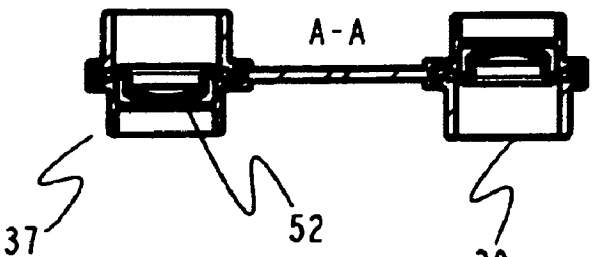
FIG. 6(D)

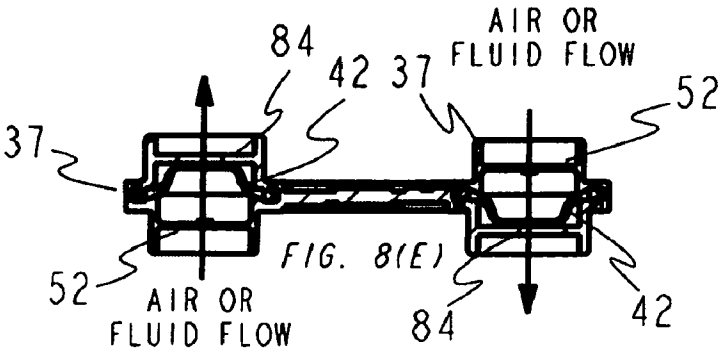
FIG. 8(E)
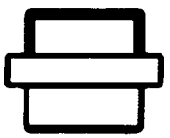
FIG. 8(C)
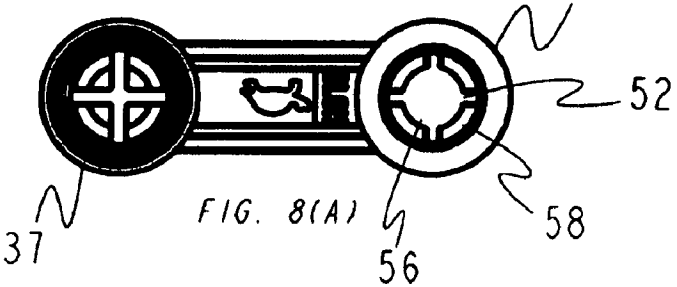
FIG. 8(A)
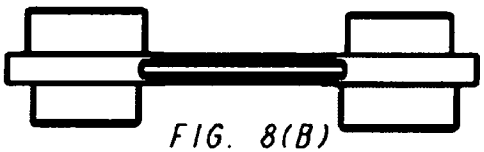
FIG. 8(B)
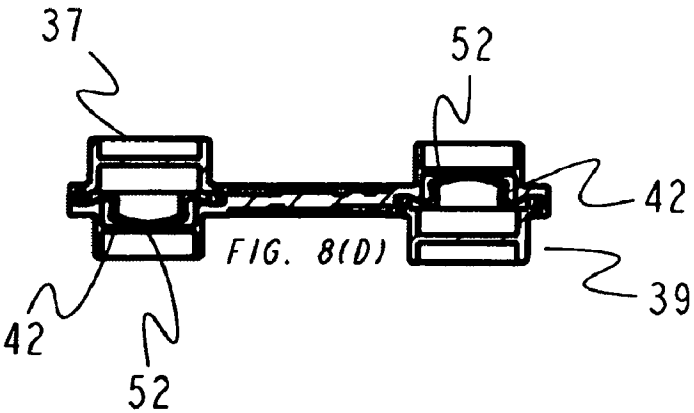
FIG. 8(D)
FIGURE 8

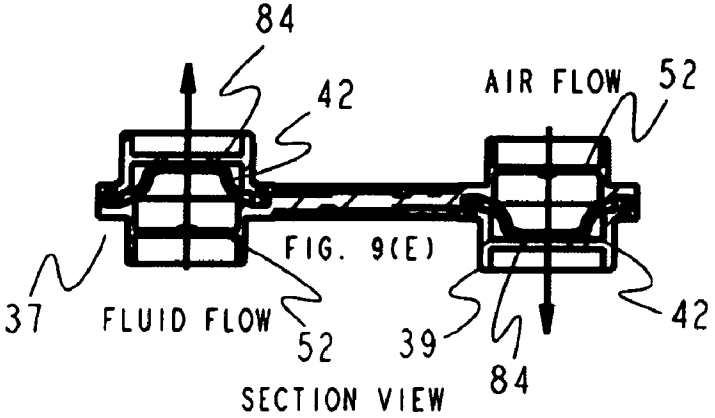
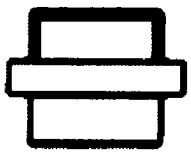
FIG. 9(C)
FIGURE 9
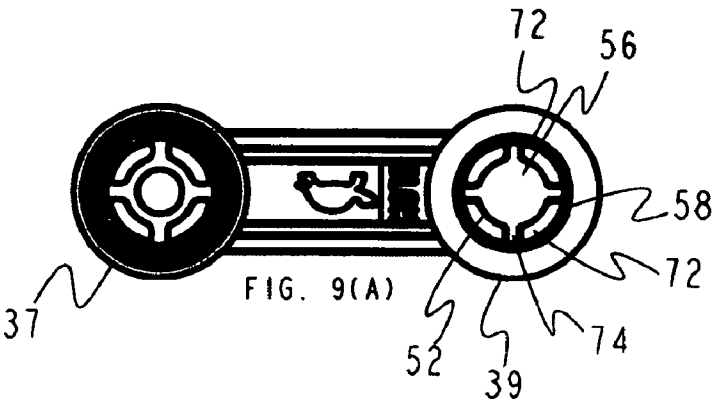
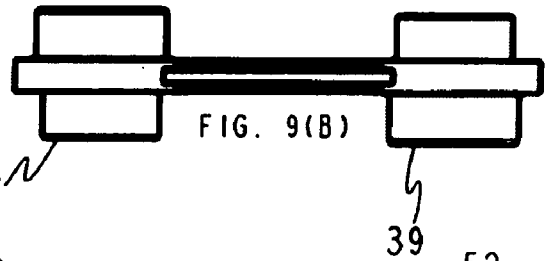
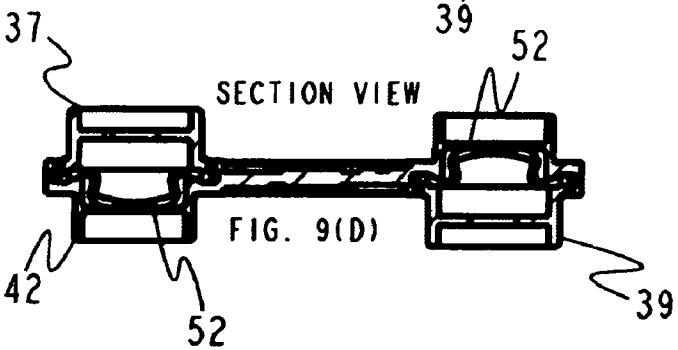

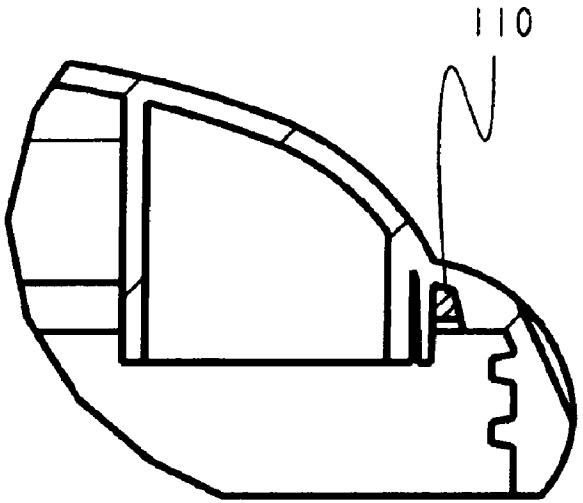
FIG. 11(A)
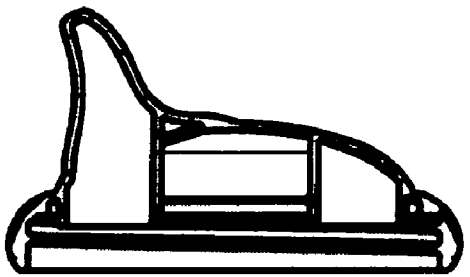
FIG. 11(B)
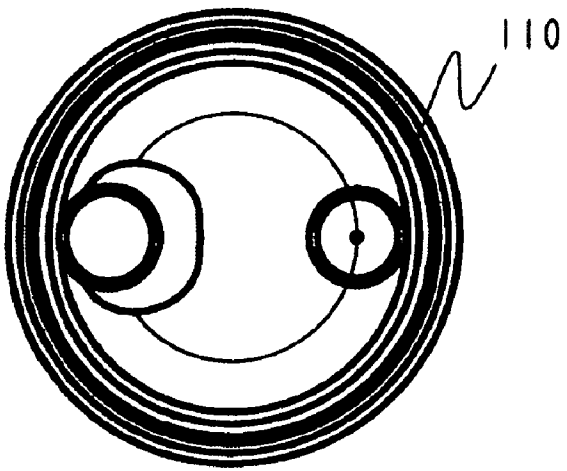
FIG. 11(C)
FIGURE 11

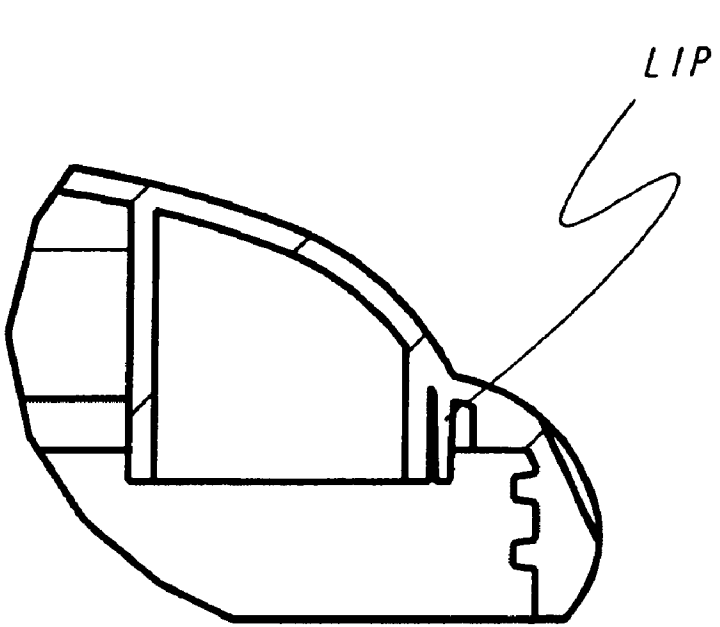
FIG. 12(A)
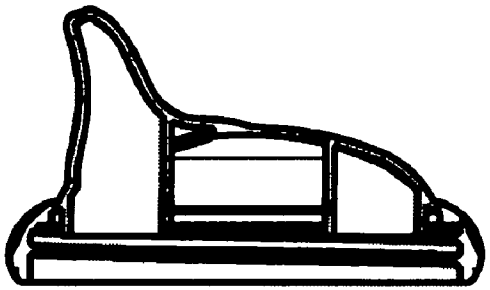
FIG. 12(B)
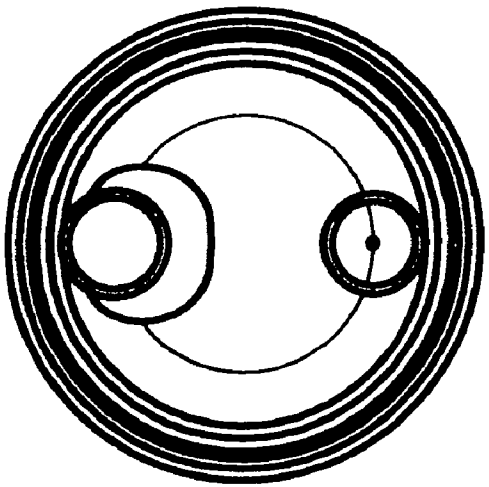
FIG. 12(C)
FIGURE 12

NO-SPILL DRINKING CUP APPARATUS

Matter enclosed in heavy brackets [ ] appears in the original patent but forms no part of this reissue specification; matter printed in italics indicates the additions made by reissue.

RELATED APPLICATIONS

The present application claims all rights of priority to U.S. Provisional Patent Application No. 60,056,218, filed Aug. 21, 1997.

FIELD OF THE INVENTION

The present invention relates to a no-spill cup assembly with an improved valve mechanism to prevent liquid from flowing out of the cup when not desired.

BACKGROUND OF THE INVENTION

No-spill cup assemblies are well known in the art. In the past, a variety of such assemblies have been developed and marketed. In general, the goal of a no-spill cup is to provide a construction which minimizes or prevents liquid from emerging out of the cup when liquid flow is not desired, i.e. when the user is not drinking. However, though the assemblies of the prior art are intended to avoid such accidents, their construction is such that they generally do not provide a secure enough protection against undesirable spilling or leakage. Thus, when such cups are inverted, or more significantly, when they are shaken vigorously, liquid will often emerge from them. This can be a particular problem with young children, for whom these cups are usually intended. Accordingly, there is a need in the art for an improved cup assembly for preventing undesired spilling of liquids.

SUMMARY OF THE INVENTION

It is an object of the present invention to provide an improved no-spill cup assembly.

It is a further object of the present invention to provide a cup assembly which prevents liquid from flowing out of the cup when the user is not drinking.

It is a further object of the invention to provide a cup assembly which minimizes and/or eliminates accidental or undesirable liquid flow or spillage out of the cup.

It is a further object of the invention to provide a cup assembly which provides the ability to regulate the flow rate of liquid out of the cup.

It is a further object of the invention to provide a cup assembly which can be used by young children, to avoid accidental spilling of liquid therefrom.

Further objects of the invention will become apparent in conjunction with the disclosure herein.

In accordance with the invention, an improved cup construction and valve assembly is provided which provides an extremely secure seal against accidental liquid flow from the cup spout. Further to the invention, a user places his or her mouth against the spout of the cup assembly to suck liquid out of the cup when desired. The act of sucking at the spout of the cup creates negative pressure or a partial vacuum against a valve in the cup spout, causing the valve to invert, or turn inside out, either partially or totally, thereby unblocking an opening such as an orifice or slit in the valve. Once the opening is unblocked, liquid can flow freely through the valve and spout.

In contrast, when not in use, the valve sits in a resting, closed position, with the valve pressed against the center seal-off, thereby sealing off the opening or slit in the valve assembly. Thus, in its relaxed state, with no negative pressure applied, the valve sits in a closed position with the fluid opening sealed by the center seal-off. Moreover, in accordance with the dual valve nature of the device in the preferred embodiment, an adjacent valve similarly seals when no negative pressure is applied, thereby blocking off the air vents in the cover of the cup, and further preventing the possibility of fluid flow. Consequently, the closed position provides an extremely secure seal against fluid leakage, such that inadvertent spills or even deliberate attempts to force liquid outside of the cup, such as by turning the cup upside down, or shaking the cup, are ineffective.

In a further embodiment of the invention, the cup assembly allows liquid flow to be regulated between regular or maximum flow and minimal flow levels or rates by rotating the position of a valve assembly in the cap or cover of the cup. The valve holder is constructed as a two subunit assembly, with one subassembly holding a valve with a larger slit or orifice for fluid flow than the valve in the second subunit. Thus, upon rotation of the valve holder, either a low-flow valve or a higher flow valve can be positioned in the hole leading to the spout. In this manner, a dual position valve assembly is provided allowing either regular flow or minimal liquid flow conditions.

BRIEF DESCRIPTION OF THE DRAWINGS

FIG. 1(a) is an exploded front view of a no-spill cup assembly in accordance with the present invention. FIG. 1(b) is an exploded perspective view of the no-spill cup assembly of FIG. 1(a).

FIG. 2(a) is an exploded front view of a second embodiment of a no-spill cup assembly in accordance with the present invention. FIG. 2(b) is an exploded perspective view of the no-spill cup assembly of FIG. 2(a).

FIG. 5(a) is an exploded front view of the cup assembly of the present invention, showing the rotation of the valve holder or assembly, into two alternate positions for placement in the cap or cover of the cup. FIG. 5(b) is an exploded perspective view, showing the placement of the valve holder into the cap, in either of the two positions illustrated in FIG. 5(a).

FIG. 6 is a series of additional views of the valve holder or assembly of FIG. 3. FIG. 6(a) is a top view of the valve holder. FIG. 6(b) is a front view of the valve holder. FIG. 6(c) is a side view of the valve holder. FIG. 6(d) is a cross-sectional view of the valve holder wherein the valve is in a relaxed state, sealing off fluid flow. FIG. 6(e) is a cross-sectional view of the valve holder, showing the valve in an inverted state, to allow fluid flow through the valve.

FIG. 8 is a series of additional views of a further embodiment of the valve assembly shown in FIG. 6. FIG. 8(a) is a top view of the valve holder or assembly. FIG. 8(b) is a front view of the valve holder. FIG. 8(c) is a side view of the valve holder.

FIG. 8(d) is a cross-sectional view of the valve holder wherein the valve is in a relaxed state, sealing off fluid flow. FIG. 8(e) is a cross-sectional view of the valve holder, showing the valve in an inverted state, to allow fluid flow through the valve.

FIG. 9 is a series of additional views of another embodiment of the valve assembly shown in FIG. 8. FIG. 9(a) is a top view of the valve holder or assembly. FIG. 9(b) is a front view of the valve holder. FIG. 9(c) is a side view of the valve holder. FIG. 9(d) is a cross-sectional view of the valve holder wherein the valve is in a relaxed state, sealing off fluid flow. FIG. 9(e) is a cross-sectional view of the valve holder, showing the valve in an inverted state, to allow fluid flow through the valve.

FIG. 11 is a series of additional views of another embodiment of the cap of the present invention. FIG. 11(a) is a partial sectional view of a cap with an insert molded or glued in gasket, in accordance with the invention. FIG. 11(b) is a side sectional view of the cap of FIG. 11(a). FIG. 11(c) is a top sectional view of the cap of FIG. 11(b).

FIG. 12 is a series of additional views of another embodiment of the cap of the present invention. FIG. 12(a) is a partial sectional view of a cap with a molded lip which wedges against into the inside surface of the cup, in accordance with the invention. FIG. 12(b) is a side sectional view of the cap of FIG. 12(a). FIG. 12(c) is a top sectional view of the cap of FIG. 12(b).

DETAILED DESCRIPTION OF THE INVENTION AND THE PREFERRED EMBODIMENTS

As will be shown in conjunction with the attached drawings, a novel cup assembly is disclosed for providing prevention against accidental liquid spills. FIGS. 1(a) and 1(b) are a front view and a perspective view, respectively, of an embodiment of the cup assembly, in accordance with the present invention. The volume of the cup or liquid holding portion of the assembly can be adjusted as desired. In one embodiment, a 7 oz. drinking cup is provided, as shown in FIG. 1. Alternatively, a 9 oz. drinking cup, as shown in FIG. 2, a 6½ oz. cup, or any other desired size can be provided, as well.

The sides of the cup can be provided with no handles, one handle, two handles or any other number of handles, for the user's use to grip the cup. This handle or handle is preferably sized for a child's hands. In addition, the outside appearance of the cup and/or the cap can be a solid color, or can be printed with any desired design.

Figure 10:
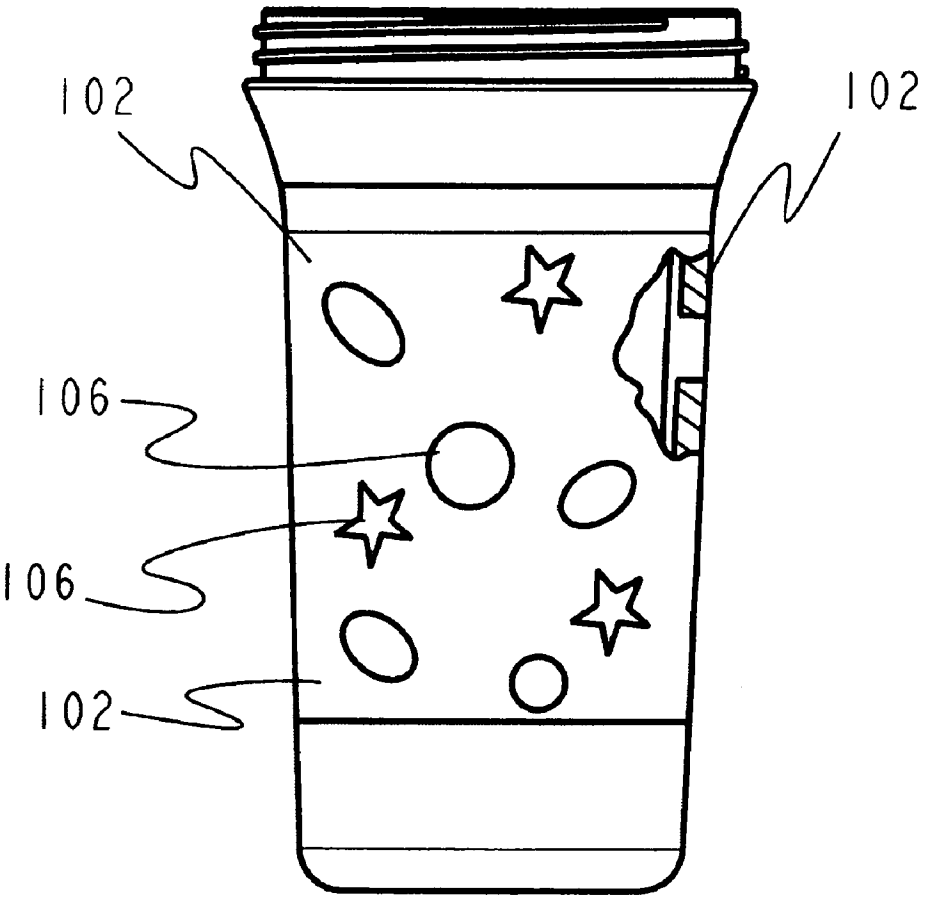
FIG. 10 is a side view of a no-spill cup with a soft gripping area, in accordance with the present invention.

In a further embodiment of the invention, a no spill cup with a soft gripping area can be provided, as shown in FIG. 10. In accordance with this embodiment, a soft ring 102 is provided around the outside of the cup. This ring can be of any width desired, and serves as a finger grip, to make it easier to grasp the cup securely. Preferably, the ring is approximately two inches (2") wide. In a preferred embodiment, the soft ring 102 has shapes or designs 106 cut out of it, such as stars, ovals, or so forth. The hard cup, in turn, has raised areas or protuberances corresponding to those shapes or designs. The soft ring fits snugly over these raised areas of the cup, each of the protruding hard shapes fitting into the cutouts of the soft ring, with the surface of the raised areas and the soft ring being flush when the ring is inserted onto the cup.

In one embodiment of the invention, the cup is constructed from polycarbonate. In an alternate embodiment, the cup is constructed from polypropylene. If desired, clear polypropylene can be utilized. Alternatively, any other suitable materials can be used for the components of the no-spill cup. The components of the cup are all made of durable materials, resistant to breakage, dishwasher safe, and preferably color fast.

In accordance with the invention, cup 7 includes a no-spill cap or cover 11, a valve holder or assembly 31 and tumbler cup 22. No-spill cap 11 includes a spout 14 for drinking liquid from the cup. The spout is sized to allow an individual to place his or her mouth over the spout to drink therefrom. In the preferred embodiment, the spout is sized for the mouth of a child, particularly for a child of a young age.

No-spill cap 11 forms a cover for placement over tumbler cup 22. When attached to the cup 22, a secure seal is formed such that no liquid can emerge through the connection between the cap 11 and cup 22. In use, cap 11 is sufficiently secured to cup 22 such that shaking the cup assembly, dropping the cup on the floor, or other vigorous movement of the cup assembly, or application of sharp force thereto, is insufficient to separate the cap from the cup.

In one embodiment, no-spill cap 11 and tumbler cup 22 include mating male and female screw threads, such that the cap 11 is a screw-on cap which can be easily rotated onto the tumbler cup 22, as shown in FIG. 2. In an alternative embodiment, a snap-on cap is used, as shown in FIG. 1. In this embodiment, a resilient ring portion of cap 11 securely fits over lip 10 of tumbler cup 22, as is well known in the art. Although a screw-on cap or a snap-on cap are shown as two preferred embodiments, alternatively, any other suitable mechanism to secure the cap to the tumbler cup can be utilized.

Either the screw-on cap and/or the snap-on cap can be further provided with a gasket 110 between the tumbler cup and the cap, to further seal the connection between the cup and the cap. This gasket can be part of the tumbler cup 22 or the cap 11, or can be a separate element inserted between the cap and the cup. In a preferred embodiment, the gasket 110 is part of cap 11, as shown in FIGS. 11(a)-(c).

Alternatively, the cap can be provided with a small annular inner lip, on the inside of the cap, which acts as a gasket. This lip, as shown in FIGS. 12(a)-(c), wedges inside the cup when the cap is screwed or placed upon it. The lip acts to further prevent the possibility of liquid flow through the contact between the cup and the cap.

In a preferred embodiment, finger grips *12* are provided on the outside of the cap, such as grooves or the like. These grips facilitate removal and application of the cap, particularly in embodiments requiring the screwing of the cap on and off of the cup.

The cap is also preferably interchangeable with numerous tumbler cups of different sizes. In this embodiment, the rim of the tumbler cups are all of the same diameter, although the tumbler cups themselves are of different volumes. For example, the same sized cap could be used on a 6½ oz. cup and/or a 7 oz. cup and/or a 9 oz. cup, and so forth.

Figure 13:
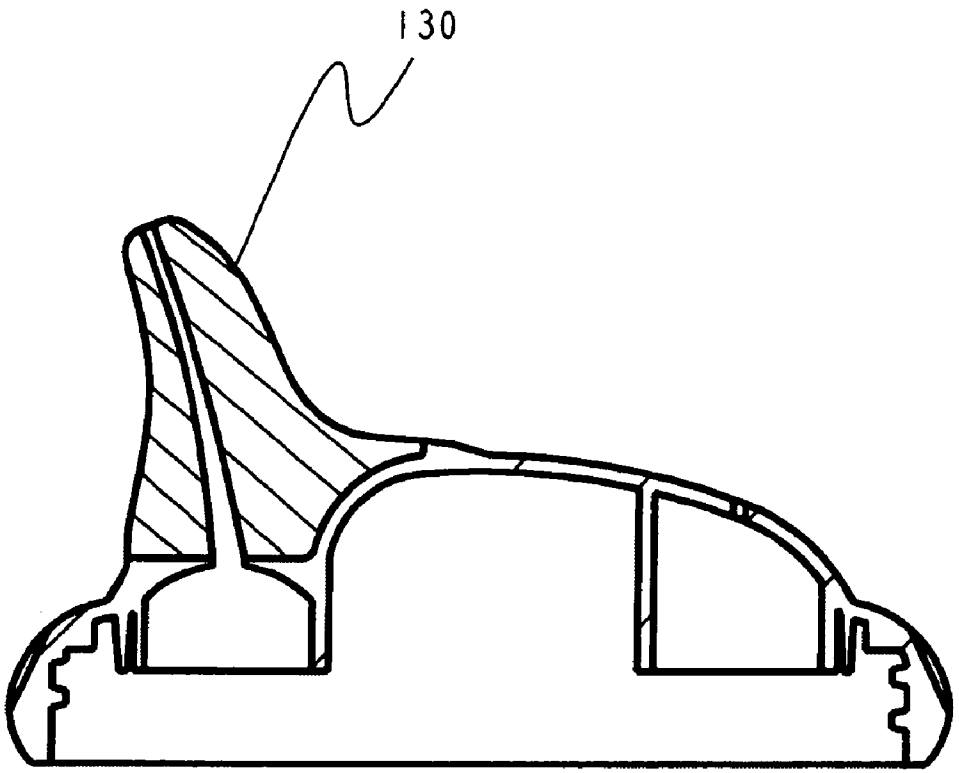
FIG. 13 is a side sectional view of a cap having a soft spout, in accordance with a further embodiment of the invention.

In a further embodiment of the cap, the cap has a soft spout 130 as shown in FIG. 13. Preferably, the spout is made of a thermo-elastimer. Spout 130 can be insert molded to a polypropylene cap, providing a combination cap having a hard section for attachment to the cup, and a soft spout portion. Preferably, the spout has a small channel extending therethrough to reduce the liquid volume which can be trapped within the spout portion.

Figure 14:
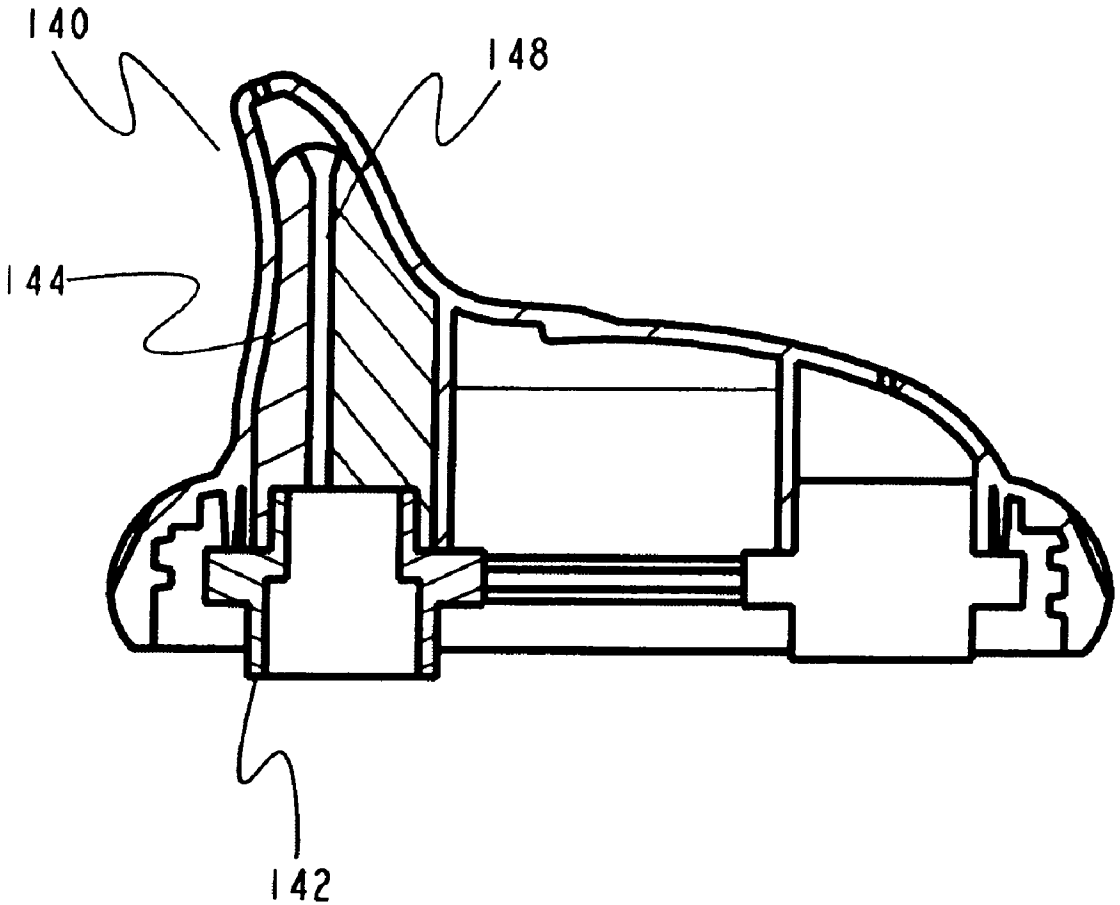
FIG. 14 is a side sectional view of a cap having a reduced volume spout, in accordance with a further embodiment of the invention.

In a further embodiment of the cap, the cap has a reduced volume spout as shown in FIG. 14. Reduced volume spout 140 is designed to reduce the volume of liquid which can be trapped within the spout. Reduced volume spout 140 has a volume reduction member 144 inserted therein to reduce the internal volume of the spout, and to provide a channel 148 for liquid flow. Preferably, valve assembly subunit 142 extends up into spout 140 to further reduce the amount of liquid which can be trapped in spout 140. Valve assembly subunit 142 can, for example, extend into volume reduction member 144. Accordingly, this embodiment reduces the space between the valve and the opening of the drinking spout, to reduce the amount of liquid potentially trapped in this area.

As shown in FIG. 1(b), no-spill cap 11 includes valve assembly carriers 16 and 18. In the preferred embodiment, valve assembly carriers 16 and 18 are tapered holes provided on the underside of the cap. Valve assembly carrier or tapered hole 18 leads to an open spout 14, providing a path for liquid flow. Thus, valve assembly carrier or hole 18 is fully open on both sides, both on its top surface, which leads to spout 14, and on its bottom surface opposite tumbler cup 32, for the flow of liquid out of tumbler cup 22 through hole 18 and through spout 14 into the user's mouth.

Valve assembly carrier or tapered hole 16, in contrast, provides a passage for the flow of air into the cup during use, allowing liquid to exit through opposing hole 18 and spout 14. Hole 16 is open on one side, i.e. on its lower surface opposite tumbler cup 22. On the opposing side, hole 16 merges into the inner surface of cap 11. The inner surface of cap 11 is further provided with one or more, preferably small, vents or holes for air flow, allowing air to flow through the vents of cap 11 and through hole 16 into the cup assembly during use.

As shown in FIGS. 1 and 2, no-spill cup 7 further includes valve holder or assembly 31. Valve holder 31 is preferably constructed from a high temperature ABS material, and is dimensioned to fit snugly into cap 11. In the preferred embodiment, valve holder is a separate assembly which fits into cap 11. Alternatively, the valve holder can be provided as an integral part of cap 11 and/or cup 7. For example, valve holder 31 can be molded as a part of cap 11, such that the valve holder is inseparable from the cap.

In the preferred embodiment, valve holder 31 is a two-subunit assembly connected by bridge 34. Each subunit of the two-subunit assembly is sized to frictionally fit into and be held by either one of tapered holes 16 and 18. The spacing between tapered holes 16 and 18 is the same as between the subunits of valve holder 31, such that the valve holder can be easily secured within cap 11. The sizing and tapering of holes 16 and 18 and the sizing of valve holder 31 are dimensioned so as to provide a secure, snug mating between the valve assembly and the tapered holes. In a preferred embodiment, the top of the valve holder (i.e. the side facing the spout) and the bottom of the valve holder (i.e. the side facing the cup) has two different diameters. The top is proportioned to fit snugly into the tapered hole, and the bottom is proportioned such that it cannot be inserted into hole 16 or 18. In this way, a mechanism is provided to prevent the valve holder from being inserted into the holes in the wrong orientation, i.e. upside down.

Figure 3:
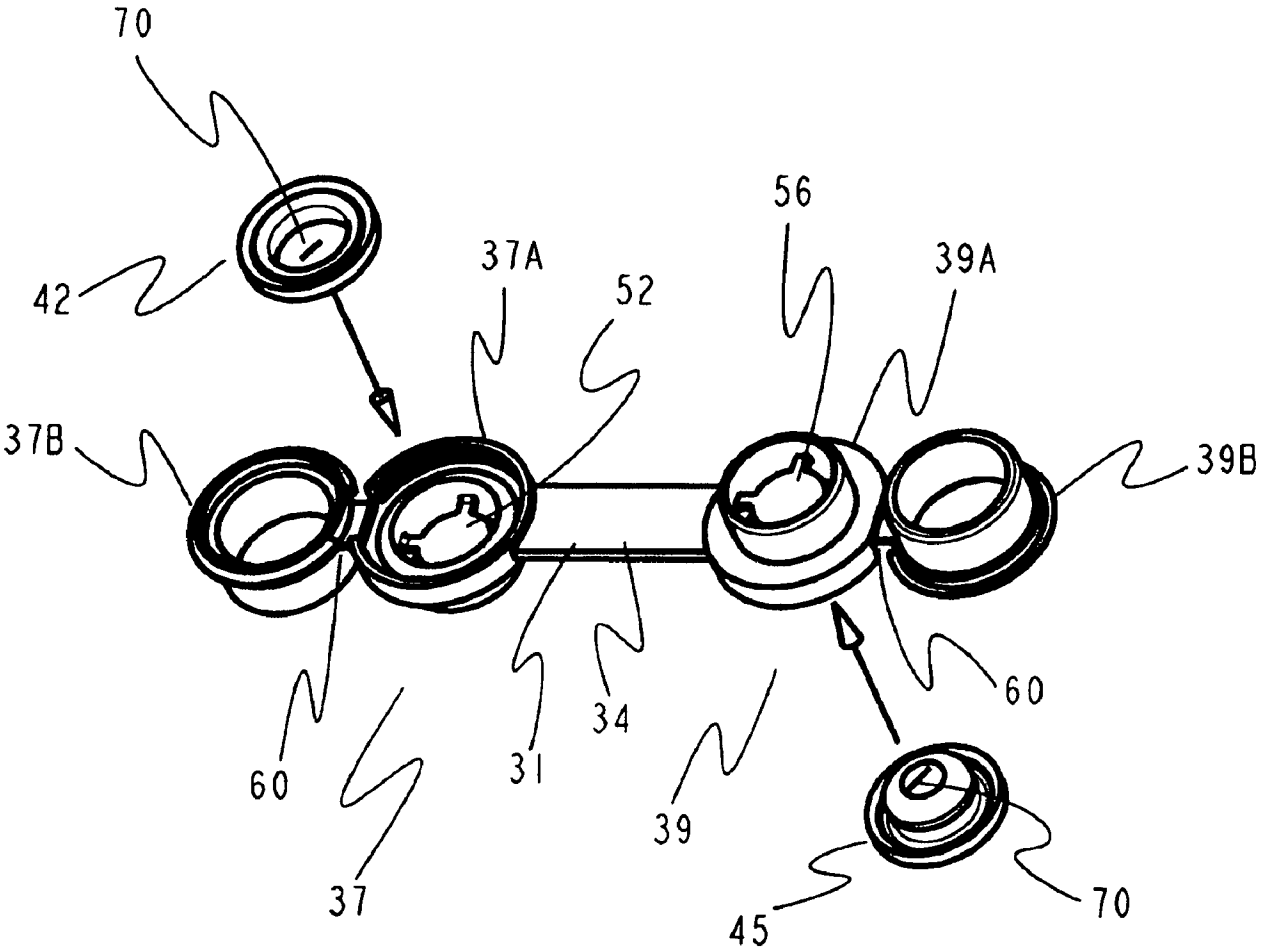
FIG. 3 is a perspective view of the valve assembly of the present invention.

FIG. 3 is an enlarged, exploded, perspective view of the valve holder of the present invention. Valve holder 31 consists of two valve holder subunits 37 and 39, connected by a bridge 34. Each valve holder subunit is intended to hold a single valve therein. As shown in the figure, valve or valve member 42 is intended for placement in subunit 37, and valve or valve member 45 is intended for placement in subunit 39. Valves 42 and 45 each include a slit for the passage of liquid. The slit is preferably through the center portion of the valve, and is dimensioned to allow a predetermined flow level or rate of liquid therethrough, as desired.

Figure 4:
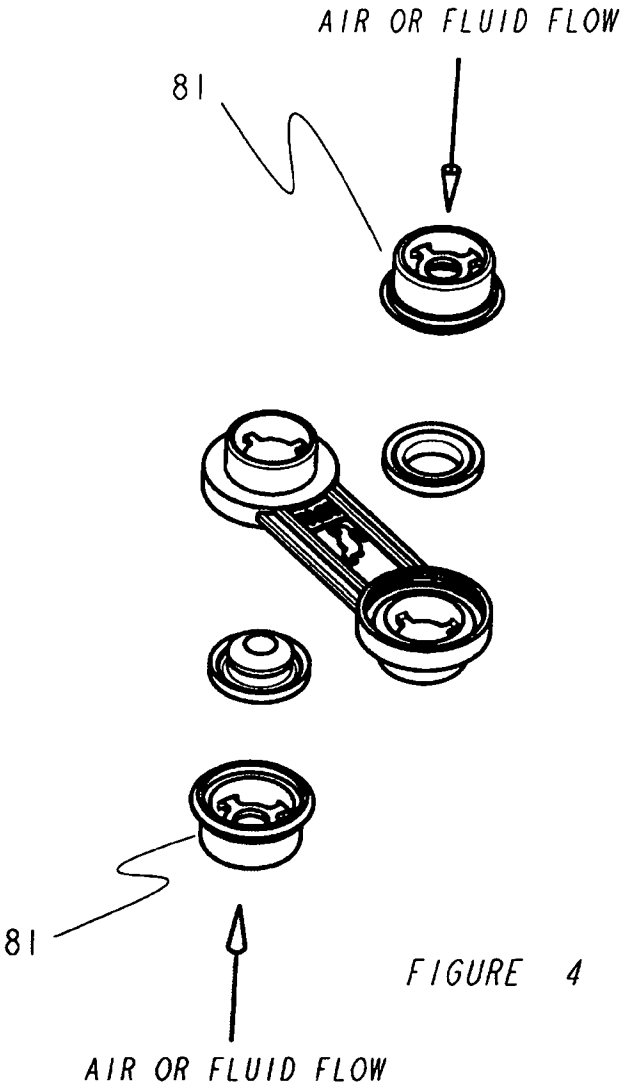
FIG. 4 is an exploded, perspective view of another embodiment of the valve assembly of the no-spill cup, in accordance with the present invention.
Figure 7:
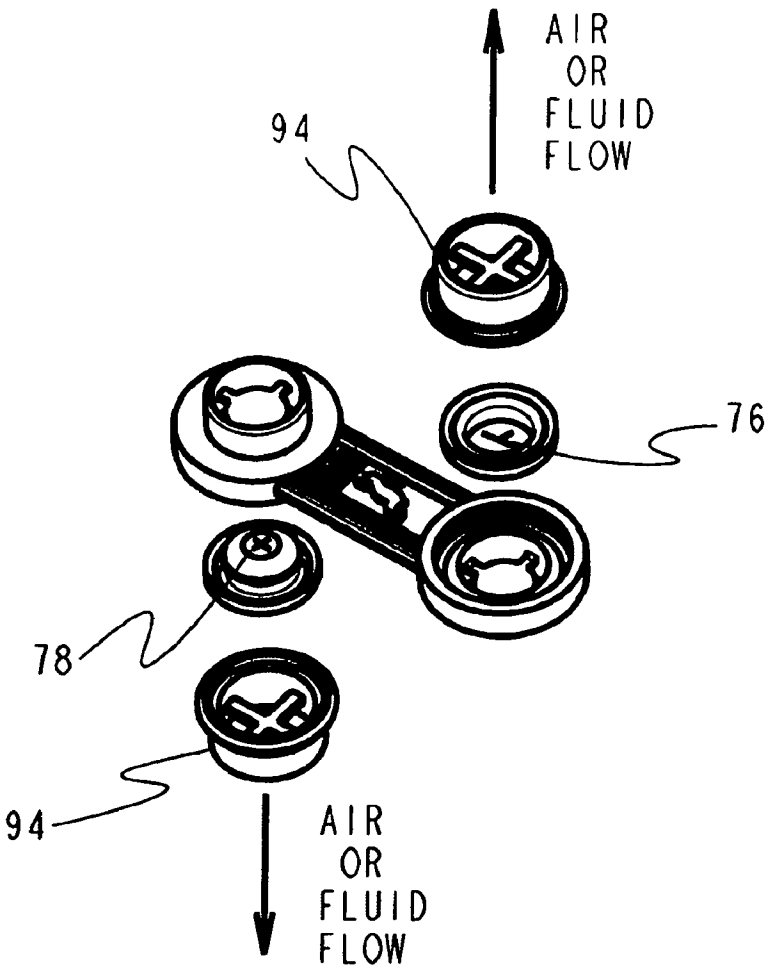
FIG. 7 is an exploded, perspective view of another embodiment of the valve assembly of the no-spill cup, in accordance with the present invention.

Valve holder subunits 37 and 39 open into sealing units 37a and 39(a) and valve retainers or endcaps 37b and 39(h), respectively. Taking subunit 37 as an example of the function of each subunit, as shown in FIG. 3, subunit 37 is initially in an open position in which the sealing unit and the valve retainer have been pulled or hinged apart. In one embodiment, the sealing unit and the valve retainer have a tab 60 connecting them, to prevent the components from being permanently separated accidentally. Alternatively, the valve retainer can be welded into place (e.g. by sonic welding), as shown in FIGS. 4 and 7. The sealing units each have at least one open section 58, such that, in the valve assembly's disassembled state, fluid can pass, unobstructed, through the sealing unit since no valve is in place. Likewise, the valve retainers are open on both sides for unobstructed passage of fluid through the valve retainer in the disassembled state when no valve is in place.

To assemble the valve assembly, valve 42 is inserted into the valve holder by placement of the valve between sealing unit 37a and valve retainer 37b. After a valve has been placed into one or both of the subunits, the valve retainers can each be folded or hinged back about tab 60, over the sealing unit 37 (or under sealing unit 39, in the orientation shown in the figure) and snapped into place to close the subunits, as shown in FIG. 5. The resilience of the sealing unit allows for a tight seal to be established between the valve retainer and the sealing unit. When closed, each subunit secures or encapsulates a valve tightly therein, maintaining the valve in place in the valve holder. For clarity, reference is primarily made to subunit 37, although subunits 37 and 39 are preferably the same in all features other than the size of the valve opening. For the purposes of the present discussion, it is assumed that subunit 37 is the subunit intended for initial placement into hole 18.

As shown in FIGS. 5, 6, 8 and 9, upon closing a subunit (e.g. subunit 37 in FIG. 3), valve 42 sits securely against center seal-off stop or center stop 52 in sealing unit 37a, with the opening 70 in valve 42 being flush against center seal-off stop 52. Valve 42 includes a top, proximal side which will face the spout of the cap, and a distal side which rests against the center seal-off stop when the valve is placed in valve holder 31.

Center stop 52 functions as a sealing portion or blocking element of the valve assembly which seals off and blocks the flow of fluid through the valve. In a preferred embodiment, center stop 52 consists of a solid central area or portion 56 which is impenetrable to the flow of liquid therethrough. Surrounding the central area or portion 56 is preferably a peripheral area or region 58, having open areas such as slots or so forth, for allowing the passage of liquid therethrough, as shown, for example in FIG. 8(a). Central area 56 or center stop 52 further includes stems 74. As shown in FIG. 9, stems 74 can further be reinforced with braces 72, which are reinforcing elements, which provide additional material strength to the connection between the stems and the valve holder.

When in the normal resting position, valve 42 relaxes to sit securely against the center stop 52, as shown in FIG. 8(d). In this resting position, opening or orifice 70 of valve 42 presses firmly against the central area 56 of center stop 52, preventing any fluid flow through the valve, and maintaining the valve in a closed configuration.

To drink from the cup, a user raises the cup to his or her mouth and begins to suck liquid through spout 14. In the process, the user creates negative pressure or a partial vacuum against the top of valve 42 in subunit 37. Valve 42 is constructed of a flexible material which is designed to fully invert and turn inside out, or to begin to invert and turn inside out, upon creation of a partial vacuum against the top of the valve 42, as shown in FIG. 8(e). For example, valve 42 can be a membrane, either in whole or in part. Preferably, the valve is constructed of Kraton or silicone. If silicone is used, a 45 durometer silicone such as Lims 6045 is preferred, which is available from General Electric or from Wacker (a subsidiary of Bayer) of Germany. The materials used for the valve assembly and its components are sufficiently durable and heat resistant that the entire valve assembly can be placed in a dishwasher or boiled.

In a preferred embodiment, the valve material is constructed of a single material with a greater thickness of material on the center area which seals off on the center stop, and with a thinner portion of material on the sidewalls. Providing a thinner sidewall portion contributes to the flexibility of the valve at its edges, which further assists and encourages inversion of the valve, by causing the valve to flex at the sidewalls first upon application of negative pressure thereto. Preferred dimensions for the valve thickness are approximately 0.4 mm of thickness on the sidewalls and approximately 0.9 mm of thickness on the center area.

Upon inversion of valve 42, opening or orifice 70 is displaced away from central area 56 of center stop 52. The inversion of the valve therefore unblocks opening 70 allowing fluid flow through the subunit. As negative pressure is being applied to the top of the valve 42 located next to the spout, negative pressure is likewise being applied to the bottom of the adjacent valve in the other subunit, located in the other tapered hole of the cup cover. Thus, this negative pressure, opens the second valve as well, by displacing the opening in the other valve away from its center stop. Inversion of valves 42 allows fluid flow to proceed through both subunits of the assembly. Liquid will flow through one subunit of the valve assembly, the subunit connected to the spout, concurrently accompanied by air flow through the other subunit of the assembly, the subunit connected to the air vents. In this manner, liquid smoothly and easily flows though the valve assembly, the spout, and out of the cup.

In a preferred embodiment, the valve assembly is further provided with a flow bridge 84. Flow bridge 84 blocks movement or expansion of the valve 42 beyond a certain maximum distance to prevent the valve from overextending itself, or from being subjected to excessive strain or distension, as shown in FIG. 8(e). Thus, the flow bridge prevents the valve from inverting beyond the point where it can no longer easily revert to its original position. In addition, the flow bridge provides a shield or a barrier preventing the valve from damage. Thus, it blocks objects such as a spoon or so forth, whether in a dishwasher or otherwise, from easily damaging the valve.

When negative pressure is released or removed from the spout, the valve reverts back to its resting position, and fluid cannot flow through the closed slit in the valve. In the resting position, no liquid will spill from or emerge out of the cup.

Further embodiments of the valve holder and assembly are shown in FIGS. 4 and 7-9. As shown in FIG. 4, instead of the valve retainer shown in FIG. 3, a detachable snap fit valve retainer 81 can alternatively be provided. Or, as shown in FIG. 7, valve retainer 94 can be provided as well. Valve retainers 81 and 94 serve the same function as valve retainers 37b and 39(b), holding and securing the valve within the valve assembly. It is preferred that the valve retainer, whichever embodiment is utilized, be sonic welded on, to ensure that the valve cannot be dislodged or removed from the holder.

Thus, in accordance with the invention, a system is provided for maintaining a tight seal against fluid flow when the cup is not in use. An extremely secure seal is provided, such that excessive or vigorous shaking is ineffective to force fluid out of the cup. Significantly, the valve construction disclosed results in a much tighter seal than that observed in the no-spill cup assemblies of the prior art. In accordance with the invention, unless the user sucks through the spout, no liquid will flow through the valve.

In the preferred embodiment, subunits 37 and 39 are preferably identical in all respects excepts for the size of the orifice or slit in valve 42 and the slit in valve 45. It is preferred that one valve be provided with a larger opening than the other valve, such as a longer slit in one valve than the other. In one embodiment, one valve is provided with an opening in the form of a slit of approximately two hundred thousandths ($^{200}/_{1000}$) of an inch in length, while the second valve is provided with a slit of approximately fifty thousandths ($^{50}/_{1000}$) of an inch. Alternatively, other lengths may, of course, be used as well in accordance with the invention.

By varying the size and/or shape of the opening in the valve, the present inventor has further provided a novel dual acting flow system for regulating fluid flow. In this system, the level of flow of liquid out of the cup during use can be easily regulated. Regulation is accomplished by a simple rotation of the valve assembly which converts the cup between a faster or higher liquid flow, and a slower or lower flow system.

As shown in FIG. 5, valve holder 31 can be inserted into cap 11 in either of two configurations. In a first configuration, valve 45, having a larger opening or slit, is placed into hole 18, the hole in communication with spout 14. In this configuration, a first, higher, flow level of liquid through the valve is established when the user sucks liquid through the spout, due to the use of the valve having the larger opening therein. By removing the valve holder 31 from holes 16 and 18, and flipping the valve holder 31 one hundred eighty degrees) (180°), the other valve 42, having the smaller opening, can be inserted into hole 18. This valve 42 provides a second, lower flow state, in which liquid can still flow out of the spout, but at a lower flow rate than flow through the first valve. In this way, the rate of flow of liquid out of the cup can be regulated by a parent. Although a two level flow system is disclosed, greater or fewer flow levels can be provided by varying the number of attached subunits having valves therein, or by providing replacement valve holders having different sized openings 70 therein. In all configurations, however, liquid only flows through the valve when the user sucks through the spout, as disclosed above.

Any form of desired opening suitable for passage of a desired level of liquid can be utilized in the valve. The opening 70 can be, for example, a slit, a slot, an orifice, a hole, or so forth. Likewise, by the term opening, it is contemplated that multiple openings of these or any other types can be provided as well.

In one embodiment, the opening 70 is an "X" shaped slot 78, as shown in FIG. 7. In another preferred embodiment, the opening is a "T" shaped slot 76, as also shown in FIG. 7. Use of the X-shaped slot 78 shown in FIG. 7, will provide a higher flow rate than the T-shaped slot 76 shown therein. The flow rate, of course, depends on the total length of the slots, or in general, on the size of the opening. Accordingly, both the X-shaped slot and the T-shaped slot can be used in a single valve assembly, each placed in its respective subunit in this preferred embodiment, a two level flow system is provided, as previously discussed.

In a further embodiment, both openings are X-shaped, with one opening larger than the other. A 7 mm opening (the length from end to end of each crossbar of the "X") can be used for the fast side, and a 6 mm opening for the slow side.

It is further preferred that the valve holder be marked to indicate which subunit is suitable for higher flow, and which for lower flow of liquid therethrough. Accordingly, the valve holders can be explicitly marked "Fast" and "Slow" as shown in FIGS. 7 and 9, respectively. Alternatively, or additionally, the subunits or the valve holders can be marked with a hare or rabbit, signifying fast flow, and a tortoise or turtle, signifying slow flow, as respectively also shown in FIGS. 7 and 9. The subunit connected to the spout is, of course, the subunit which controls the liquid flow rate. The valve holder can be marked, for example, on the subunit itself, or on the bridge in an area directly adjacent to the subunit, as shown in the figures. In one embodiment, the valve holder is marked on the top and bottom (i.e. the sides facing the spout and the cup, respectively), such that the symbols and/or words can be seen from the top when the valve holder is being inserted, and from the bottom, once it has already been inserted, to determine which speed valve is in place in the spout. In an alternate embodiment, the words and/or symbols are only on the bottom of the valve, so that the user can see them from the bottom when inserting the valve holder, and can also view the valve holder from the bottom, once inserted.

Having described this invention with regard to specific embodiments, it is to be understood that the description is not meant as a limitation since further modifications may suggest themselves, or may be apparent to those in the art. It is intended that the present application cover all such modifications and improvements thereon.

We claim:

[1. An apparatus for use in a no-spill drinking cup, said apparatus comprising:

a valve holder, such valve holder comprising at least one valve and a blocking element, said valve comprising a flexible material, said blocking element comprising an area of material which is impenetrable to the flow of liquid, said valve further comprising an opening through said flexible material, said valve having a resting position wherein said flexible material sits with said opening against said blocking element such that said valve is closed to the passage of liquid through said valve, said valve moving into an open position for the passage of liquid through said valve upon the application of negative air pressure to the top of said valve, said open position being a position wherein said flexible member comprising said opening lifts off of said blocking element.]

[2. An apparatus as claimed in claim 1, further comprising a cover, said valve holder being located in said cover, and a cup, said cover being adapted to attach to said cup.]

[3. An apparatus for use in a no-spill drinking cup, comprising:

a flexible valve member comprising an opening through said valve member, said valve member having a closed position and an open position, wherein said valve member sits against a blocking element with said opening against said blocking element when in said closed position such that said blocking element blocks the passage of fluid through said opening in said valve member, and wherein said valve member moves away from said blocking element to allow passage of liquid though said opening of said valve member upon application of negative air pressure to said valve member.]

[4. An apparatus as claimed in claim 3, further comprising a cover, said flexible valve member being located in said cover, and a cup, said cover being adapted to attach to said cup.]

[5. A no-spill cup apparatus, comprising:

a flexible valve member comprising an opening in said valve member, said flexible member having a proximal side and a distal side; and a blocking element, said blocking element comprising a first area which is impenetrable to the flow of liquid, and a second area through which liquid can flow, said distal side of said flexible valve member resting against said blocking element when said flexible valve member is in the resting, closed position such that said opening of said flexible valve member rests against said first area when said flexible valve member is in said resting, closed position, said flexible valve member backing off said blocking element upon the application of negative air pressure to said proximal side of said flexible valve member to allow fluid to flow through said second area of said blocking element and through said opening of said flexible valve member.]

[6. An apparatus as claimed in claim 5, wherein said opening comprises a slit.]

[7. An apparatus as claimed in claim 5, wherein said first area is the central area of said blocking element, and wherein said second area is the peripheral area of said blocking element.]

8. A no-spill drinking cup apparatus, comprising:

a flexible valve member, said flexible valve member having an opening therein; and, a blocking element, said flexible valve member resting against said blocking element when said valve member is in its closed position such that said opening sits against said blocking element to block the passage of liquid through said opening;

*said flexible valve member further comprising an open position, said flexible valve member being displaced away from said blocking element in said open position to provide liquid access to said opening, said flexible member assuming said open position upon application of negative air pressure to the top of said valve member;*

*wherein said flexible valve member inverts upon application of negative air pressure to said valve member to move said opening away from said blocking element.*

[9. An apparatus as claimed in claim 8, said flexible valve member further comprising an open position, said flexible valve member being displaced away from said blocking element in said open position to provide liquid access to said opening, said flexible member assuming said open position upon application of negative air pressure to the top of said valve member.]

[10. An apparatus as claimed in claim 9, wherein said flexible valve member inverts upon application of negative air pressure to said valve member to move said opening away from said blocking element.]

11. An apparatus as claimed in claim 8, wherein said flexible valve member is located in a valve assembly.

12. An apparatus as claimed in claim 11, wherein said valve assembly comprises at least one subunit for containing said valve member.

13. An apparatus as claimed in claim 12, wherein said valve assembly comprises at least two subunits, each of said subunits comprising a valve member therein.

14. An apparatus as claimed in claim 12, wherein said valve assembly comprises at least two subunits, a first subunit comprising a first valve member comprising a first opening, and a second subunit comprising a second valve member comprising a second opening, said first opening being larger than said second opening.

15. An [assembly] *apparatus* as claimed in claim 14, wherein said first opening is an "X" shaped slot.

16. An [assembly] *apparatus* as claimed in claim 14, wherein said second opening is a "T" shaped slot.

17. An [assembly] *apparatus* as claimed in claim 14, wherein said first opening is an "X" shaped slot and said second opening is a "T" shaped slot.

18. An [assembly] *apparatus* as claimed in claim [8] *11*, wherein said *valve* assembly further comprises a removable cap.

19. An [assembly] *apparatus* as claimed in claim [8] *18*, wherein said cap comprises a valve assembly carrier for securing said valve assembly to said cap.

20. An [assembly] *apparatus* as claimed in claim 18, further comprising a cup for attachment to said removable cap.

21. An [assembly] *apparatus* as claimed in claim 20, wherein said cap is provided with screw threads for screwing onto said cup.

22. An [assembly] *apparatus* as claimed in claim 20, wherein said cap is a snap-on cap, for attachment to said cup.

23. An apparatus as claimed in claim 12, wherein said blocking element is located in said subunit.

24. An apparatus as claimed in claim 23, wherein said blocking element comprises a solid central area impenetrable to liquid flow, and a peripheral region surrounding said central area, said peripheral region having at least one area open to the passage of liquid.

25. An apparatus as claimed in claim 24, wherein said opening rests against said central [region] *area* when said valve member is in its closed position.

26. An apparatus as claimed in claim 23, wherein said subunit comprises a valve retainer for securing said flexible valve member in said subunit.

27. An apparatus as claimed in claim 8, wherein said opening comprises a slit.

[28. An apparatus as claimed in claim 1, wherein said opening is a slit.]

[29. An apparatus as claimed in claim 3, wherein said opening is a slit.]

*30. An apparatus as claimed in claim 8, wherein said opening is a hole.*

*31. An apparatus as claimed in claim 8, wherein said inversion of said flexible valve member constitutes a change in shape from convex to concave.*

*32. An apparatus as claimed in claim 8, wherein said inversion of said flexible valve member constitutes a change in shape from concave to convex.*

* * * * *